S. H. SWOPE.
BANDAGE FASTENER.
APPLICATION FILED APR. 24, 1914.
1,104,575.
Patented July 21, 1914.
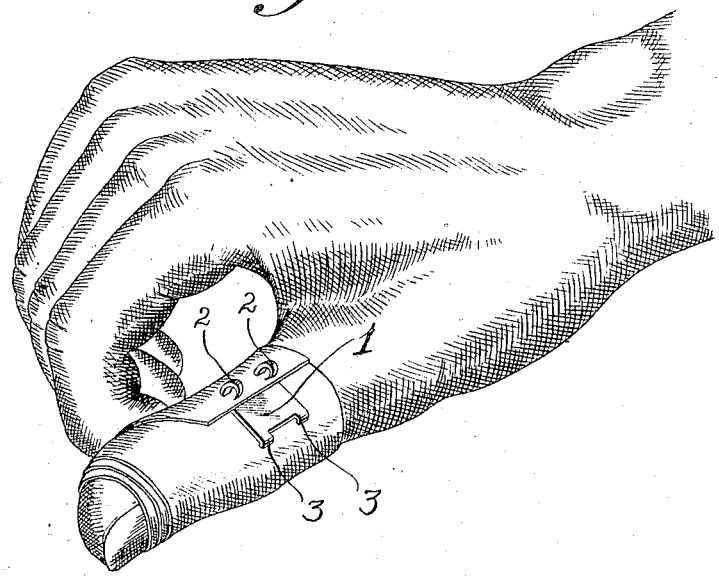
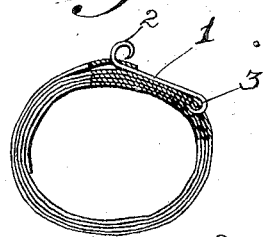
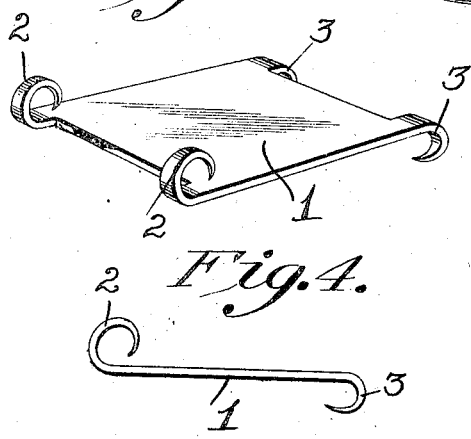
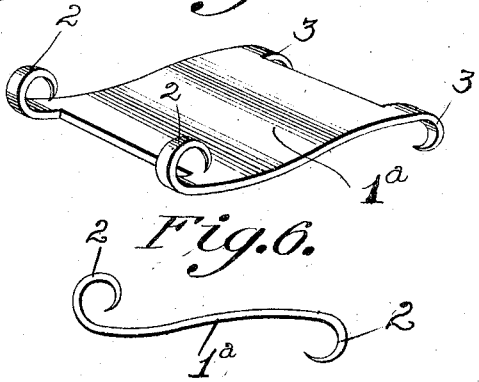
Witnesses
W. W. Rockwell
Herman Jakobsson
Inventor
Sylvanus Howard Swope,
By Knight Bros
Attorney

UNITED STATES PATENT OFFICE.

SYLVANUS HOWARD SWOPE, OF GREENVILLE, OHIO.

BANDAGE-FASTENER.

1,104,575.

Specification of Letters Patent. Patented July 21, 1914.

Application filed April 24, 1914. Serial No. 834,138.

*To all whom it may concern:*

Be it known that I, SYLVANUS HOWARD SWOPE, a citizen of the United States, residing at Greenville, in the county of Darke and State of Ohio, have invented certain new and useful Improvements in Bandage-Fasteners, of which the following is a specification.

This invention relates to a device for securing the ends of bandages and similar articles when applied for use, so as to prevent their becoming undone or loose.

The primary object of the invention is to provide a simple and convenient fastener which can be easily applied and will effectually answer its intended purpose.

The invention consists in a fastener comprising a body-portion having a plurality of curved attaching claws projecting preferably upwardly and downwardly from the body and ends thereof disposed oppositely to each other. The body portion may be curved to serve an additional important function which will be hereinafter described; however, it is to be understood that the scope of the invention is not limited to the precise disclosure shown in the accompanying drawings; the same being merely for the purpose of illustration.

In the drawings:—Figure 1 is a perspective view showing one form of the device applied; Fig. 2 is a transverse section of a bandage with the same form of device applied; Fig. 3 is a perspective view of one form shown in Figs. 1 and 2; Fig. 4 is an edge view of the same; Fig. 5 is a perspective view of a modified form; Fig. 6 is an edge view of the same.

Similar numerals of reference indicate the same parts in all the several figures.

The fastener may be made of any suitable material, but preferably of gold, silver or nickel, which will provide a neat appearance, as well as prevent its soiling the bandage.

The body of the fastener may be made either flat, as shown at 1, in Figs. 1 to 4 inclusive, or slightly curved as shown at 1ª, in Figs. 5 and 6. The flat form will be more desirable over comparatively plane surfaces, while the slightly curved body will be more desirable when used over rounded surfaces. A further advantage secured by thus curving the body of the fastener is that it makes it possible to obtain a more substantial purchase on the end of the fastener in engaging the fastener in the bandage.

The body portion 1 is provided with a plurality of claws which are curved and are presented preferably in opposite directions to each other and preferably located in opposite sides of the plane of the plate. The upwardly projecting claws 2 are curved slightly more than the downwardly projecting claws 3, and form attaching rings approximately closed to resist unintentional detachment which serve as combined gripping and hinging claws, while the downwardly disposed claws are approximately semi-annular and rearwardly presented so as to be held in engagement by the tension of the goods. Another advantage which is derived from having the upwardly projecting claws curved to a nearly closed ring is that the points will be thus so disposed that it will be impossible to prick the skin or catch in the clothing of the wearer.

I claim:—

A fastener for connecting two parts of a bandage comprising a body portion, a pair of combined gripping and hinging claws and a pair of gripping claws located on the respective ends of said body portion and extending longitudinally therefrom and lying beyond the ends of the body portion, each pair of said claws being oppositely deflected away from the general plane of the body portion and then by a return bend, extended substantially in the direction of and inclined toward the body portion; the combined gripping and hinging claws forming approximately closed rings, and the gripping claws having rearwardly presented openings between their points and the body portion to facilitate gripping the bandage.

The foregoing specification signed at Greenville Ohio this 10th day of April, 1914.

SYLVANUS HOWARD SWOPE.

In presence of two witnesses:
O. R. KUCKENBERGER,
PATIENCE BENTLER.

Copies of this patent may be obtained for five cents each, by addressing the "Commissioner of Patents, Washington, D. C."